United States Patent
Tsukada et al.

(10) Patent No.: US 6,174,260 B1
(45) Date of Patent: *Jan. 16, 2001

(54) CONTINUOUSLY VARIABLE TRANSMISSION

(75) Inventors: Yoshiaki Tsukada; Kazuhiko Nakamura, both of Saitama (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/270,503

(22) Filed: Mar. 17, 1999

(30) Foreign Application Priority Data

Mar. 20, 1998 (JP) .................................................. 10-071802

(51) Int. Cl.[7] .................................................. F16H 15/52

(52) U.S. Cl. ........................ 476/50; 475/193; 74/606 R

(58) Field of Search .................. 476/50, 51; 475/190, 475/193, 210, 214; 74/606 R; 474/13, 15, 70, 72; 180/230

(56) References Cited

U.S. PATENT DOCUMENTS

| | | | |
|---|---|---|---|
| 2,886,986 | * 5/1959 | Kopp | 475/194 |
| 3,420,122 | * 1/1969 | Okabe | 476/50 X |
| 4,360,353 | * 11/1982 | Hattori et al. | 474/15 X |
| 4,364,445 | * 12/1982 | Iizuka et al. | 180/230 X |
| 4,468,979 | * 9/1984 | Inagaki et al. | 74/606 R |
| 4,574,652 | * 3/1986 | Shichinohe et al. | 180/230 X |
| 4,606,310 | * 8/1986 | Makino | 74/606 R X |
| 4,671,134 | * 6/1987 | Luo | 180/230 X |
| 5,545,101 | * 8/1996 | Kawase et al. | 475/193 |
| 5,597,056 | * 1/1997 | Blake | 476/50 X |
| 5,746,676 | * 5/1998 | Kawase et al. | 476/50 |

FOREIGN PATENT DOCUMENTS

| | | | |
|---|---|---|---|
| 523462 | * 4/1955 | (IT) | 180/230 |
| 8-247245 | * 9/1996 | (JP) . | |
| 9177919 | 7/1997 | (JP) . | |
| 9177920 | 7/1997 | (JP) . | |
| 9236161 | 9/1997 | (JP) . | |

* cited by examiner

Primary Examiner—Charles A Marmor
Assistant Examiner—Ankur Parekh
(74) Attorney, Agent, or Firm—Birch, Stewart, Kolasch & Birch, LLP

(57) ABSTRACT

To make a continuously variable transmission small and to be able to freely set a transmission ratio of a driving force transmitted from an engine to a continuously variable transmission. A continuously variable transmission for carrying out gear changes by a rotary drive member and a driven rotary member supported so as to be freely rotatable at a main transmission shaft coming into contact with variable speed rotary members supported at gears and so as to be freely rotatable is housed within a transmission chamber partitioned from a crank chamber and enclosing lubricating oil. The driving force of the crank shaft of the engine is inputted to a driven gear provided at the main transmission shaft that passes through a cover member of the transmission chamber and protrudes to the inside of the crank chamber. By providing the driven gear outside of the transmission chamber, a situation where the dimensions of the continuously variable transmission T are made large due to the driven gear can be prevented and the transmission chamber can be made small. Further, the transmission ratio of the drive force transmitted to the continuously variable transmission T can be freely set just by changing the external diameter of the driven gear.

14 Claims, 6 Drawing Sheets

CONTINUOUSLY VARIABLE TRANSMISSION

BACKGROUND OF THE INVENTION

1. Field of the Invention

The present invention relates to a continuously variable transmission for outputting rotation of a rotating input shaft inputted with an engine drive force as a continuously variable transmission and more particularly relates to a drive input structure for inputting drive force to the continuously variable transmission.

2. Description of Background Art

Continuously variable transmissions that continuously vary speed by continuously changing a position of contact of a rotating transmission member along a generating line of a variably rotating member formed in a cone shape are well known, as disclosed in, for example, Japanese Patent Laid-open Publications Hei. 9-177919, Hei. 9-177920 and Hei. 9-236161. The aforementioned continuously variable transmissions of the related art input engine driving force to a main transmission shaft by having a driven gear provided at a main transmission shaft face a window hole formed in a carrier (cone holder) and having a driven gear provided at a crank shaft mesh with the driven gear.

If the driven gear provided at the main transmission shaft is housed within the carrier, the carrier cannot be made small and the continuously variable transmission therefore becomes large. Further, the external diameter of the driven gear cannot be freely changed and it is therefore difficult to freely set the transmission ratio of the driving force transmitted from the engine to the continuously variable transmission.

SUMMARY AND OBJECTS OF THE INVENTION

As the present invention sets out to resolve the aforementioned situation, it is the object of the present invention to provide a continuously variable transmission that can be made small where a transmission ratio of a driving force transmitted from an engine can be freely set.

In order to achieve the above object, there is provided a continuously variable transmission drive input structure for housing a continuously variable transmission for outputting rotations of a rotating input shaft to a transmission chamber enclosing lubricating oil and defined in a crank chamber of an engine as an independent space, wherein a drive force transmitting member for transmitting drive force of the engine to the continuously variable transmission is provided at said rotating input shaft protruding outwards from said transmission chamber.

According to the above configuration, the drive force transmission member for inputting drive force of the engine to the rotating input axis of the continuously variable transmission is provided with a main transmission shaft protruding outwards from the transmission chamber housing the continuously variable transmission and a situation where the dimensions of the continuously variable transmission and the transmission chamber have to be made large because of the drive force transmission member can be prevented. Further, as the continuously variable transmission is housed in a transmission chamber where the crank chamber is independently defined, the lubrication system for the continuously variable transmission is separated from the engine lubrication system and stable lubrication can therefore be achieved without affecting the continuously variable transmission.

In addition, according to the present invention a centrifugal governor is provided for controlling the transmission ratio of the continuously variable transmission and is housed within the transmission chamber.

According to the above configuration, the transmission ratio of the continuously variable transmission can be automatically changed by the centrifugal governor and the continuously variable transmission can be made small by integrally forming the centrifugal governor.

In addition, the present invention provides for the driving force transmission member to be constructed as a gear.

According to the above configuration, by constructing the drive force transmitting member for transmitting the drive force of the engine to the rotating axis as a gear, the transmission ratio of the driving force transmitted to the continuously variable transmission can be freely set just by changing the external diameter of this gear.

In addition, the present invention provides that the portion of the rotating input shaft projecting outwardly from said transmission chamber is sealed using a sealing member.

According to the above configuration, the leaking of lubricating oil enclosed in the transmission chamber to the crank chamber is prevented by sealing the outer periphery of the rotating input shaft with a sealing member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The following is a description of a practical example of the present invention based on an embodiment shown in the attached drawings.

Figure 1:
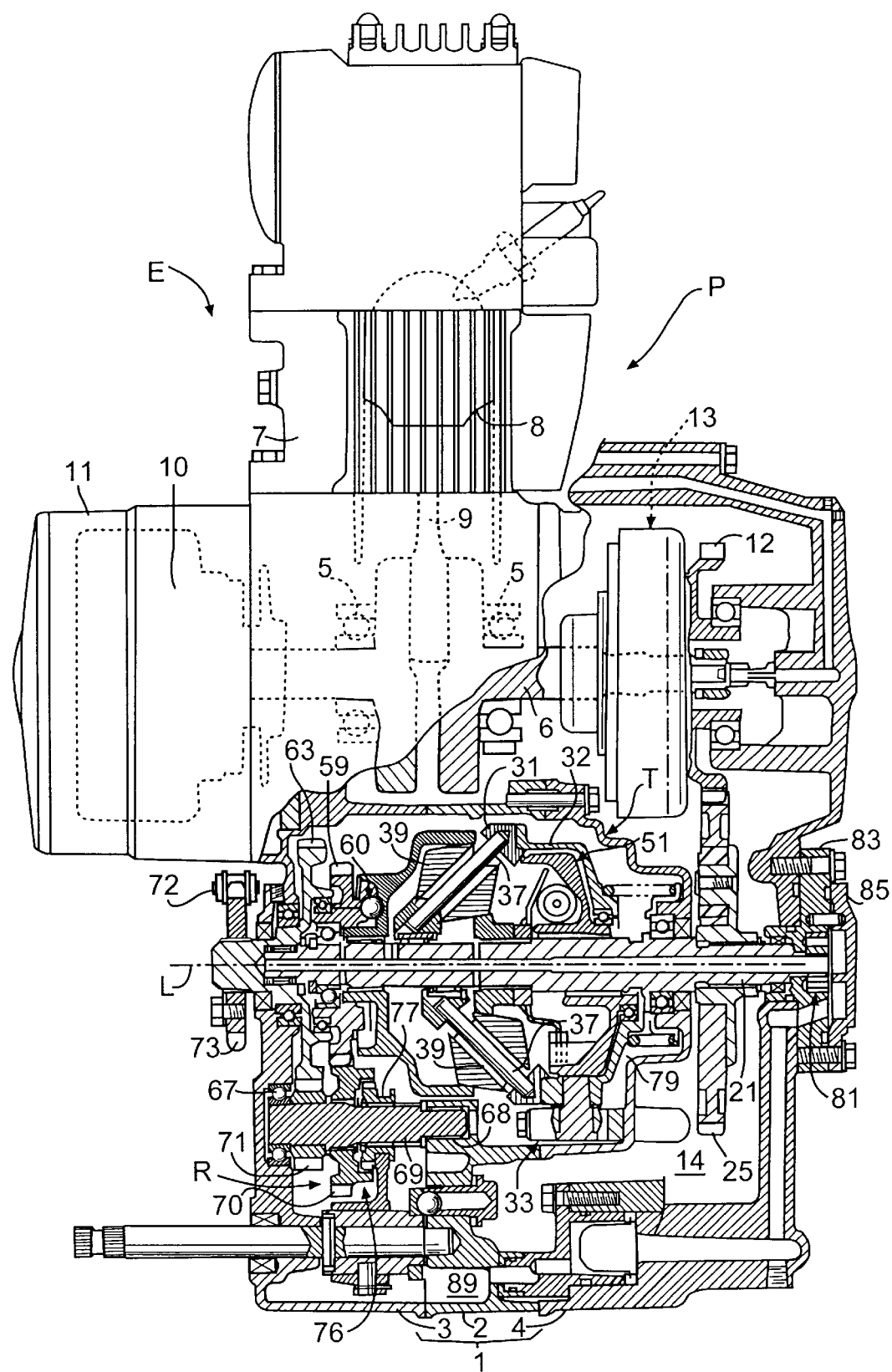
FIG. 1 is a longitudinal cross section of a vehicle power unit.

As shown in FIG. 1, a power unit P is mounted on a motorcycle and is provided with a casing 1 housing an engine E, continuously variable transmission T and a sub-transmission R. The casing 1 also functions as a crank case for the engine and is partitioned into three parts, a center casing 2, a right casing 3 coupled with the left side of the center casing 2, and a right casing 4 coupled with the right side of the center casing 2. A crank shaft 6 supported at the center casing 2 and the left casing 3 via a pair of ball bearings 5, 5 is connected to a piston 8 fitting to a cylinder block 7, that is supported in a similar manner at the center casing 2 and the left casing 3, in a freely slidable manner via a connecting rod 9.

A generator 10 is provided at the left end of the crank shaft 6 and is covered by a generator cover 11 coupled at the left side of the left casing 3. A drive gear 12 is supported so as to be relatively rotatable at the outer periphery of the right end of the crank shaft 6 extending within the left casing 4 and can be coupled to the crank shaft 6 by an automatic centrifugal clutch 13.

Figure 2:
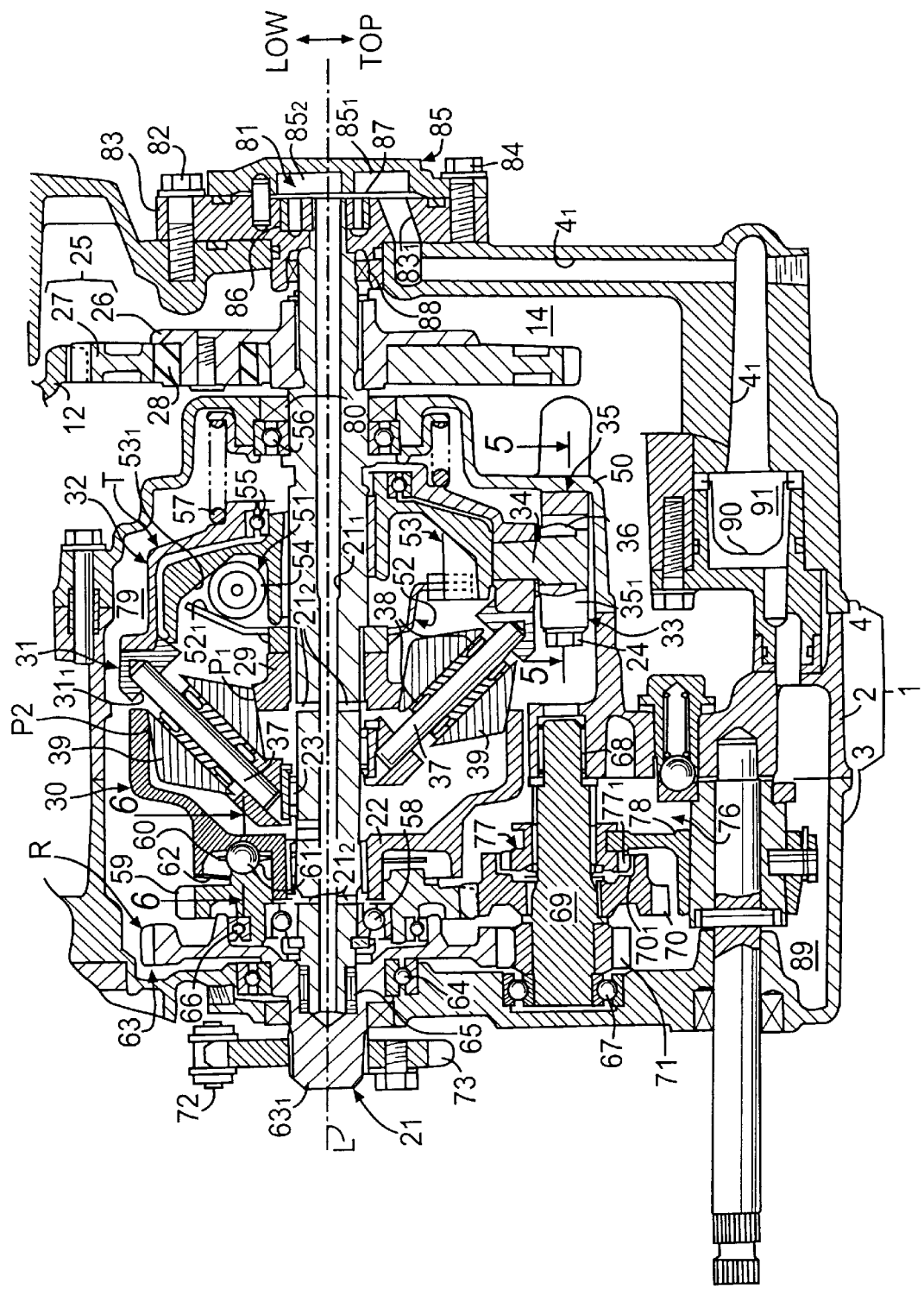
FIG. 2 is an enlarged view of a continuously variable transmission as illustrated in FIG. 1.

As becomes clear with reference to accompanying FIG. 2, a driven gear 25 that meshes with the drive gear 12 is fixed to a main transmission shaft 21 (i.e. the rotating input axis of the present invention) of the continuously variable transmission T. The driven gear 25 comprises an inner gear half 26 spline-coupled to the main transmission shaft 21 and an outer gear half 27 coupled to the inner gear half 26 via a plurality of rubber dampers 28 . . . in such a manner as to be slightly relatively rotatable. When the engine torque transmitted to the main transmission shaft 21 from the drive gear 12 via the driven gear 25 changes, the occurrence of shock can then be reduced by deformation of the rubber dampers 28.

Next, a description is given with reference to FIG. 2 of the configuration of the continuously variable transmission T.

A rotary drive member 29 equipped with a frictional contact surface facing radially outwardly is spline-coupled to the outer periphery of the main transmission shaft 21 and a driven rotary member 30 equipped with a frictional contact surface facing radially inwards is supported so as to be relatively rotatable via a needle bearing 22. A carrier first half 31 formed with a conical outline is supported at the outer periphery of the main transmission shaft 21 via a needle bearing 23 in such a manner as to be relatively rotatable and slidable in the axial direction. A carrier second half 32 with a cap-shaped outline is coupled to the carrier first half 31.

Figure 5:
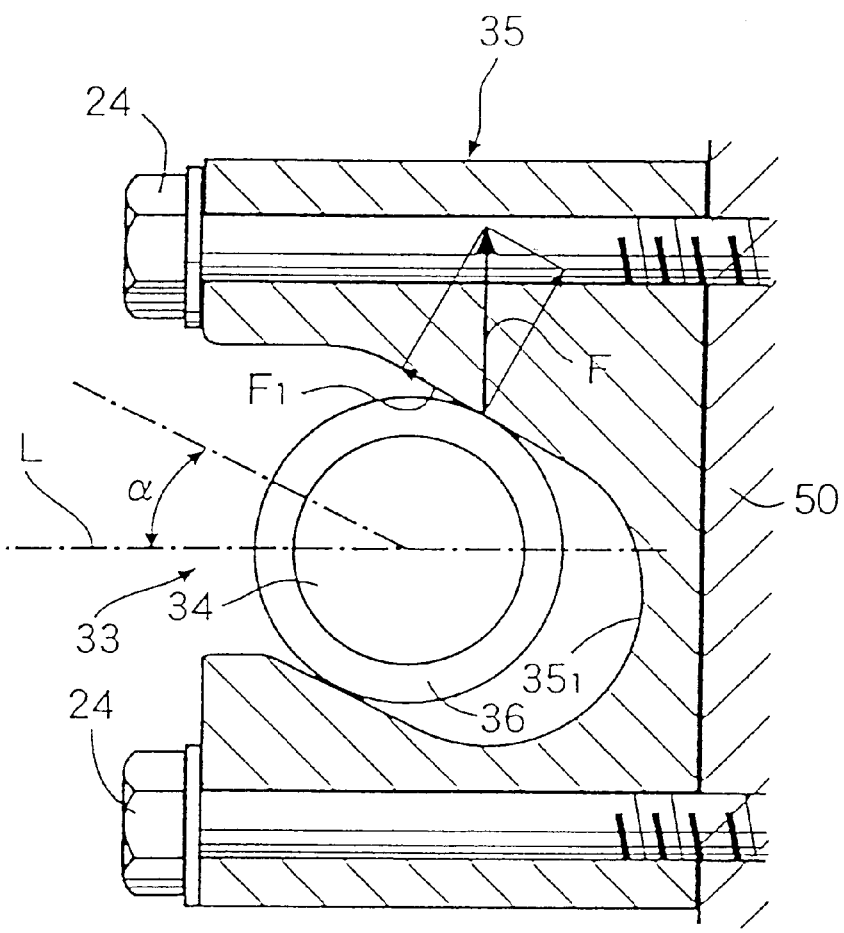
FIG. 5 is a cross section taken along line 5—5 of FIG. 2.

As is clear with reference to the accompanying FIG. 5, a torque cam mechanism 33 for preventing rotation of the carrier halves 31 and 32 with respect to the casing 1 comprises a pin 34 embedded in a radial direction at the outer periphery of the carrier second half 32, a roller 36 supported so as to be freely rotatable at the pin 34 and a guide block 35 fixed by bolts 24, 24 to the inner wall surface of the right casing 4. The roller 36 is then coupled to a guide channel $35_1$ formed at this guide block 35. The direction of the guide channel 35 is inclined at an angle α with respect to an axis L of the main transmission shaft 21.

Figure 3:
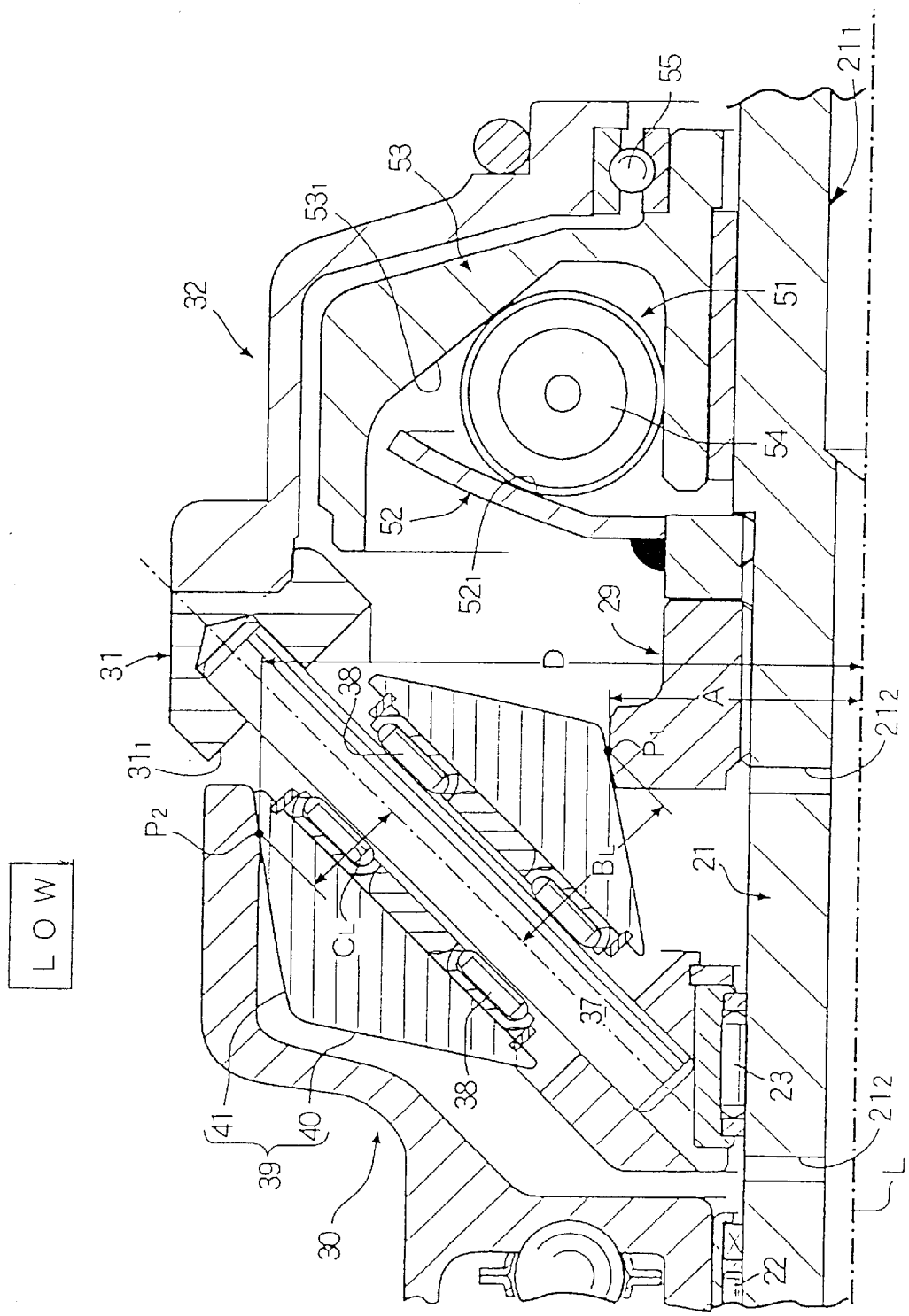
FIG. 3 is an enlarged view of the essential parts of FIG. 2 (low ratio)
Figure 4:
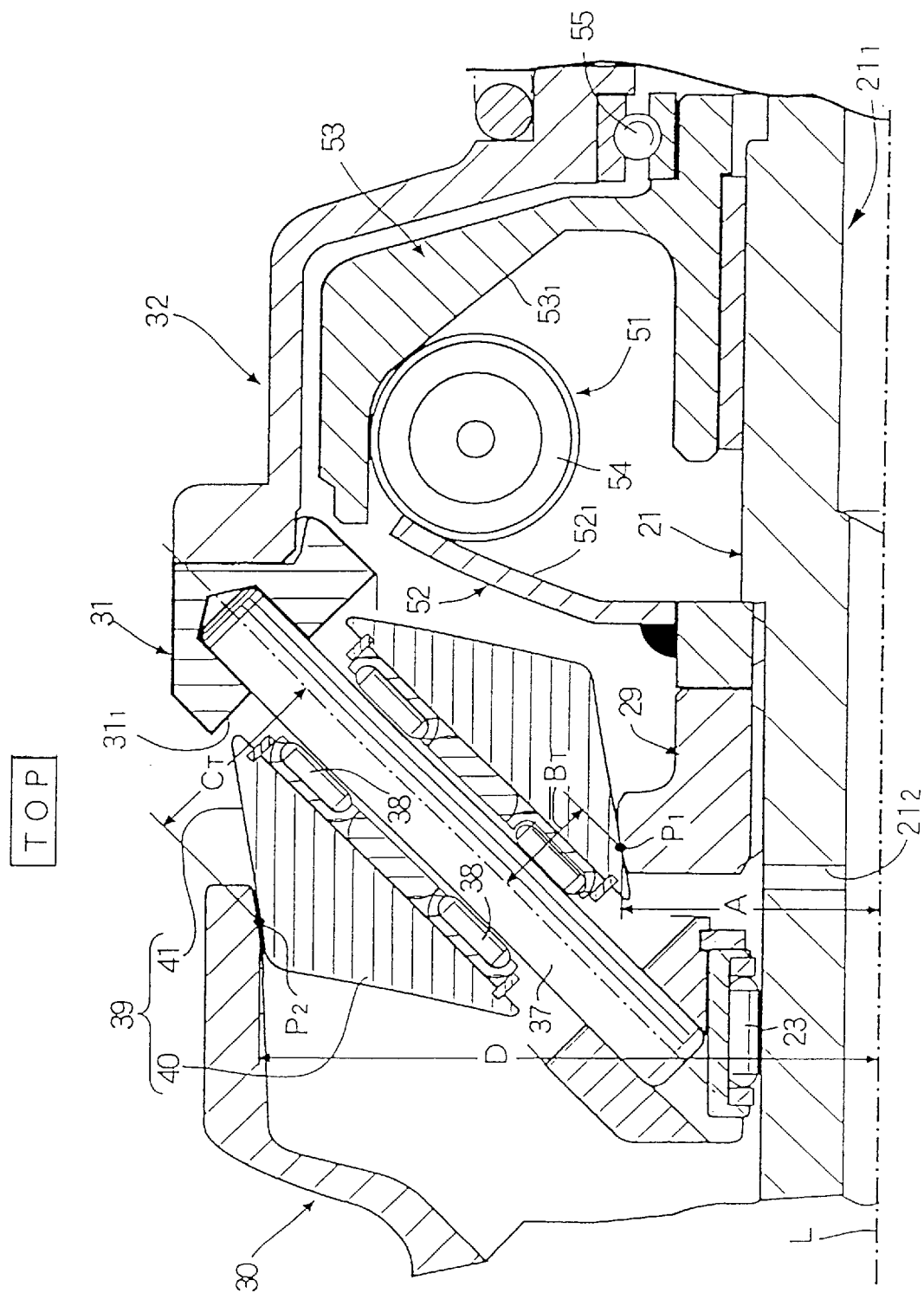
FIG. 4 is an enlarged view of the essential parts of FIG. 2 (top ratio)

As is clear from FIG. 3 and FIG. 4, a plurality of supporting axes 37 are formed across a plurality of window holes $31_2$ formed at the carrier first half 31, and variable speed rotary members 39 . . . are rotatably, axially and slidably supported via needle bearings 38, 38 at the supporting axes 37. The supporting axes 37 are arranged on a conical generating line taking the axis L of the main transmission shaft 21 as a center line. Each variable speed rotary member 39 has a conical first friction transmission surface 40 and a second friction transmission surface 41 connected at a large diameter portion. The first friction transmission surface 40 comes into contact with the rotary drive member 29 at a first contact part $P_1$ and the second friction transmission surface 41 comes into contact with the driven rotary member 30 at a second contact part $P_2$.

As shown in FIG. 2, a centrifugal governor 51 is provided within the carrier second half 32 for sliding the gear halves 31 and 32 in an axial direction in response to the speed of the main transmission shaft 21 and changing the transmission ratio of the continuously variable transmission T. The centrifugal governor 51 comprises a stationary cam member 52 fixed to the main transmission shaft 21, a movable cam member 53 supported so as to be freely slidable in the axial direction at the main transmission shaft 21 and rotating as a single body with the stationary cam member 52, and a plurality of centrifugal weights 54 . . . arranged between a cam surface $52_1$ of the stationary cam member 52 and a cam surface $53_1$ of the movable cam member 53. Both the movable cam member 53 and the carrier second half 32 can be not only movable relative to each other but also axially movable as a single body when they are coupled using a ball bearing 55.

The vicinity of the right end of the main transmission shaft 21 is supported at a cover member 50, fixed to the center casing 2, via a ball bearing 56. The carrier first half 31 and the carrier second half 32 are then urged to the left by the restoring force of a spring 57 compressed between this cover member 50 and the carrier second half 32. When the rotational speed of the main transmission shaft 21 is increased, the centrifugal weights 54 move radially outwardly due to the centrifugal force and press both cam surfaces $52_1$ and $53_1$. The movable cam member 53 then moves to the right against the restoring force of the spring 57 and the carrier second half 32 connected via the ball bearing 55 to the movable cam member 53 moves to the right together with the carrier first half 31.

Figure 6:
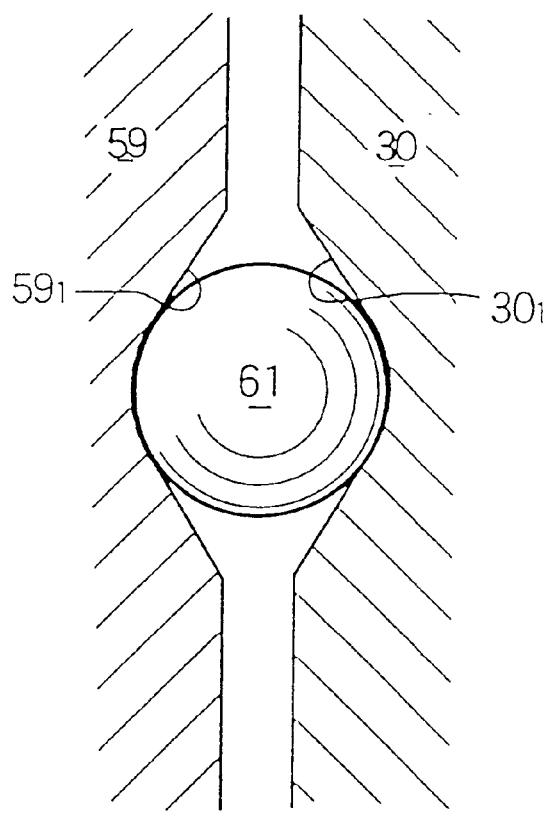
FIG. 6 is a cross section taken along line 6—6 of FIG. 2.

As can be understood from FIG. 2, a pressure regulating cam mechanism 60 is provided between the right end of the output gear 59 supported freely so as to be relatively rotatable at the outer periphery of the main transmission shaft 21 via the ball bearing 58 and the left end of the driven rotary member 30. As illustrated in FIG. 6, the pressure regulating cam mechanism 60 sandwiches a ball 61 between a plurality of concave parts $59_1$ formed at the right end of the output gear 59 and a plurality of concave parts $30_1$ formed at the left end of the driven rotary member 30. A plate spring 62 lies between the output gear 59 and the driven rotary member 30 and is for applying a preload to the driven rotary member 30 that urges the driven rotary member 30 in the right direction. When the driven rotary member 30 operates due to torque and relative rotation occurs with the output gear 59, the driven rotary member 30 is urged in a direction (right direction) away from the output gear 59 by the pressure regulating cam mechanism 60.

Next, a description is given of the configuration of the sub-transmission R with reference to FIG. 2.

A third reduction gear 63 is supported so as to be freely rotatable by a ball bearing 64 arranged between the left casing 3, a needle bearing 65 arranged between the main transmission shaft 21 and a ball bearing 66 arranged between the output gear 59. A reduction shaft 69 is supported at the left casing 3 and the center casing 2 via a ball bearing 67 and a needle bearing 68 and a first reduction gear 70 and a second reduction gear 71 supported at the reduction shaft 69 mesh with the output gear 59 and the third reduction gear 63, respectively. A drive sprocket 73 wound with a continuous chain 72 is provided at a final output axis $63_1$ formed integrally with the third reduction gear 63 and protruding outwardly from the left casing 3. Rotation of the main transmission shaft 21 is therefore transmitted to the driving wheel via the output gear 59, first reduction gear 70, second reduction gear 71, third reduction gear 63, drive sprocket 73 and continuous chain 72.

The first reduction gear 70 is supported so as to be relatively and freely rotatable with respect to the reduction shaft 69 and a neutral clutch 76 consisting of a dog clutch is provided for fastening and unfastening the first reduction gear 70 to and from the reduction shaft 69. The neutral clutch 76 is equipped with a shifter 77 spline-coupled to the reduction shaft 69 so as to be freely slidable in the axial direction and a fork 78 that couples with an operating member (not shown) operated by a rider in such a manner that the shifter 77 is made to slide. Therefore, when the shifter 77 is made to move to the left side in the drawing by the fork 78, dog teeth $77_1$ of the shifter 77 and dog teeth $70_1$ of the first reduction gear 70 mesh and the first reduction gear 70 is coupled to the reduction shaft 69 via the shifter 77. On the other hand, when the shifter 77 is made to move to the right in the drawing by the fork 78, the dog teeth $77_1$ of the shifter 77 and the dog teeth $70_1$ of the first reduction gear 70 move away from each other and the coupling of the first reduction gear 70 and the reduction shaft 69 is released.

If the rotation of the wheels is transmitted in reverse from the sub-transmission R to the continuously variable transmission T when the motorcycle is pushed so as to move the motorcycle, it is necessary to push the motorcycle with a large force in order to overcome the frictional force of each of the parts of the continuously variable transmission T. However, if the neutral clutch 76 is released at this time, the first reduction gear 70 of the sub-transmission R is separated from the reduction shaft 69, reverse transmission of driving force to the continuously variable transmission T is prevented and the motorcycle can be moved with just a light pushing.

Next, a description is given of the structure for lubricating the continuously variable transmission T and the sub-transmission R.

As shown in FIG. 2, the continuously variable transmission T and the sub-transmission R are housed within a transmission chamber 79 defined by a left casing 3 center casing 2 and cover 50. The transmission chamber 79 is separated from the inner space of the crank chamber 14 by sealing the outer periphery of the main transmission shaft 21 that passes through the cover member 50, using a sealing member 80. The continuously variable transmission T and the sub-transmission R are lubricated by lubricating oil enclosed within the transmission chamber 79 and the engine E is lubricated by lubricating oil stored within the crank chamber 14. The respective lubricating oils therefore do not become mixed, i.e. lubricating oil stored in the bottom part of the crank chamber 14 lubricates each part of the engine E as a result of being agitated by the driven gear 25 provided at the main transmission shaft 21. On the other hand, the continuously variable transmission T and the sub-transmission R are lubricated by lubricating oil circulated by an oil pump 81 provided at an end of the main transmission shaft 21.

The oil pump 81 constituted by a trochoid pump comprises a pump housing 83 fixed to the right casing 4 using a bolt 82, a pump cover 85 fixed to the pump housing 83 using a bolt 84, an outer rotor 86 housed so as to rotate freely in the pump housing 83 and an inner rotor 87 meshing with the inner periphery of the outer rotor 86 so as to rotate freely. The inner rotor 87 is fixed to the right end of the main transmission shaft 21 that passes through the pump housing 83 via a sealing member 88.

A filter chamber 91 housing the oil filter 90 is provided at the right side of an oil reservoir 89 formed at the lower part of the transmission chamber 79. The downstream side of this filter chamber 91 and an inlet port $85_1$ of the oil pump 81 communicate via an oil passageway $4_1$ formed at the right casing 4 and an oil passageway $83_1$ formed at the pump housing 83. An outlet port $85_2$ of the oil pump 81 communicates with an oil passageway $21_1$ extending in an axial direction within the main transmission shaft 21 and a plurality of oil passageways $21_2$ branching radially from the oil passageway $21_1$.

Next, a description is given of the operation the embodiment of the present invention provided with the aforementioned configuration.

As shown in FIG. 3 and FIG. 4, a distance A between a first point of contact $P_1$ of the rotary drive member 29 and the axis L of the main transmission shaft 21 is a fixed value regardless of the transmission ratio, and a distance B between the first point of contact $P_1$ of the rotary drive member 29 and the supporting axes 37 is variable ($B_L$, $B_T$). A distance C between a second point of contact $P_2$ of the driven rotary member 30 and the supporting axes 37 is variable ($C_L$, $C_T$), and a distance D between the second point of contact P2 of the driven rotary member 30 and the axis L of the main transmission shaft 21 is a fixed value.

When the rotational speed of the rotary drive member 29 is taken to be NDR, the rotational speed of the driven rotary member 30 is taken to be NDN and the transmission ratio R is defined by R=$N_{DR}$/$N_{DN}$, the transmission ratio R is given by:

$$R=N_{DR}/N_{DN}=(B/A)\times(D/C).$$

As shown in FIGS. 2 and 3, when the engine E is rotating at low speed, the rotational speed of the driven gear 25 driven by the drive gear 12 is low. The centrifugal force acting on the centrifugal weights 54 of the centrifugal governor 51 is therefore also small and the carrier halves 31 and 32 are both moved to the left due to the resilience of the spring 57. When the carrier first half 31 moves to the left, the first point of contact $P_1$ of the rotary drive member 29 moves to the large diameter side of the first friction transmission surface 40 so that the distance B increases to the maximum value $B_L$, and the second point of contact $P_2$ of the driven rotary member 30 moves to the small diameter side of the second friction transmission surface 41, so that the distance C is reduced to a minimum value $C_L$. The distances A and D are fixed. Therefore, when the distance B increases to the maximum value $B_L$ and the distance C falls to the minimum value $C_L$, the transmission ratio R becomes large and the continuously variable transmission T is set to a low ratio.

On the other hand, as shown in FIGS. 2 and 4, when the engine E is rotating at high speed, the rotational speed of the driven gear 25 driven by the drive gear 12 is high. The centrifugal force acting on the centrifugal weights 54 of the centrifugal governor 51 is therefore also large. The carrier halves 31 and 32 therefore both move to the right due to the resilience of the spring 57 because of the operation of the centrifugal weights 54 . . . moving radially outwardly under the centrifugal force. When the carrier first half 31 moves to the right, the first point of contact $P_1$ of the rotary drive member 29 moves to the small diameter side of the first friction transmission surface 40 so that the distance B reduces to the minimum value $B_T$. Further, the second point of contact $P_2$ of the driven rotary member 30 moves to the large diameter side of the second friction transmission surface 41 and the distance C increases to a maximum value $C_T$.

The distances A and D are fixed. Therefore, when the distance B falls to the minimum value $B_T$ and the distance C increases to the maximum value $C_T$ the transmission ratio R becomes small, and the continuously variable transmission T is set to the top ratio.

The transmission ratio of the continuously variable transmission T can therefore be made to change in a continuously variable manner between the low transmission ratio and the top transmission ratio in response to the rotational speed of the engine E. However, as the transmission ratio control is carried out automatically by the centrifugal governor 51, cost reductions can be made due to simplification of the configuration and the continuously variable transmission T can be made smaller when compared with the case where a transmission control device for carrying out transmission operations manually from outside of the casing is provided or the case where an electronic transmission control device is provided.

In the above way the rotation of the rotary drive member 29 is transmitted to the driven rotary member 30 via the variable speed rotary members 39 . . . at the prescribed transmission ratio R and the rotation of the driven rotary member 30 is transmitted to the output gear 59 via the pressure regulating cam mechanism 60. At this time, when relative rotation occurs with the output gear 59 due to the torque acting on the driven rotary member 30, the driven rotary member 30 is urged away from the outlet gear 59 by the pressure regulating cam mechanism 60. This urging force works in cooperation with the urging force of the plate spring 62 and generates the surface pressure for bringing the first point of contact $P_1$ of the rotary drive member 29 into contact with the first friction transmission surface 40 and the surface pressure for bringing the second point of contact $P_2$ of the driven rotary member 30 into contact with the second friction transmission surface 41.

When the continuously variable transmission T changes the transmission ratio, the carrier second half 32 is urged to turn around the main transmission shaft 21 due to the transmission torque reaction force of the rotary drive member 29. However, transmission torque reaction force is absorbed since a roller 36 of the torque cam mechanism 33 supported at the carrier second half 32 is engaged with the guide channel $35_1$ formed in the guide block 35, and both of the carrier halves 31 and 32 can therefore slide in the axial direction without rotating.

When the engine torque is suddenly increased with the intention of dramatically accelerating the vehicle, the transmission torque reaction force acting on the carrier second half 32 also increases dramatically in accompaniment with the increased engine torque. As a result, as shown in FIG. 5, the roller 36 presses against the wall of the inclined guide channel 35, with a load F and the carrier second half 32 is urged to the left side (low transmission ratio side) of FIG. 2 by a component $F_1$ of the load F in the direction of the guide channel $35_1$, i.e. as the transmission ratio is automatically changed to the low transmission ratio side by the operation of the torque cam mechanism 33, the so-called kick-down effect is exhibited and the vehicle can accelerate in an effective manner.

Control of the transmission ratio at the time of kick down is automatically carried out by the torque cam mechanism 33 in response to changes in the engine torque, and reductions in cost due to the simplification of the configuration together with reductions in the size of the continuously variable transmission T can be achieved. Further, the characteristics of the transmission ratio change can be easily adjusted just by changing the shape of the guide channel $35_1$ of the torque cam mechanism 33.

When the oil pump 81 is driven by the main transmission shaft 21 during operation of the continuously variable transmission T and the sub-transmission R. lubricating oil that has been sucked up from the oil reservoir 89 via the oil filter 90, the oil passageway $4_1$ of the right casing 4, the oil passageway $83_1$ of the pump housing 83 and the inlet port 85, of the pump cover 85 is supplied to the inside of the transmission chamber 79 via the outlet port $85_2$ of the pump housing 85 and the oil passageways $21_1$ and $21_2$ of the main transmission shaft 21. Lubricating oil supplied to the transmission chamber 79 then flows back to the oil reservoir 89 after lubricating the first friction transmission surface 40 and the second friction transmission surface 41 of the variable speed rotary members 39 of the continuously variable transmission T and each of the bearings and gear meshing parts of the continuously variable transmission T and the sub-transmission R.

Stable and reliable lubrication can therefore be achieved for the continuously variable transmission T and the sub-transmission R by providing a lubrication system for the continuously variable transmission T and the sub-transmission R that is independent from the lubrication system for the engine E. Further, the oil pump 81 is provided at and directly driven by the end of the main transmission shaft 21, the oil pump 81 and the continuously variable transmission T can be made close to each other when compared with the case of driving the oil pump 81 using the crank shaft 6, the oil passageways for the lubricating oil can therefore be made shorter and the configuration of a system for transmitting the rotations of the main transmission shaft 21 to the oil pump 81 as driving power can be simplified. In particular, as oil passageways $21_1$, $21_2$ . . . , $4_1$, for the lubricating oil are formed at the inside of the main transmission shaft 21 driving the oil pump 81 and the inside of the right left casing 4 supporting the oil pump 81, specific members are not required to construct these oil passageways and the number of components can therefore be reduced.

As the driven gear 25 for transmitting driving power to the main transmission shaft 21 of the continuously variable transmission T is provided on the outside of the cover member 50 that compartmentalizes the transmission chamber 79, the continuously variable transmission T and the transmission chamber 79 are prevented from becoming large due to the driven gear 25 the dimensions of the driven gear 25 can be arbitrarily set regardless of the capacity of the transmission chamber 79 and the transmission ratio of the driving force inputted at the driven gear 25 can be changed.

The present invention is by no means limited by that described in the above and various design modifications are possible provided these are within the spirit and scope of the invention.

For example, the present invention can be applied to a continuously variable transmission of an arbitrary configuration other that of the continuously variable transmission described in the embodiment.

According to the present invention, the drive force transmission member for inputting a driving force of the engine to the rotating input axis of the continuously variable transmission is provided with a main transmission shaft protruding outwardly from the transmission chamber housing the continuously variable transmission, a situation where the dimensions of the continuously variable transmission and the transmission chamber have to be made large because of the drive force transmission member can be prevented. Further, as the continuously variable transmission is housed in a transmission chamber where the crank chamber is independently defined, the lubrication system for the continuously variable transmission is separated from the engine lubrication system and stable lubrication can therefore be achieved without affecting the continuously variable transmission.

According to the present invention, the transmission ratio of the continuously variable transmission can be automatically changed by the centrifugal governor and the continuously variable transmission can be made small by integrally forming the centrifugal governor.

According to the present invention, by constructing the drive force transmitting member for transmitting the drive force of the engine to the rotating axis as a gear, the transmission ratio of the driving force transmitted to the continuously variable transmission can be freely set just by changing the external diameter of this gear.

According to the present invention, leaking of lubricating oil enclosed in the transmission chamber to the crank chamber is prevented by sealing the outer periphery of the rotating input shaft with a sealing member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A continuously variable transmission comprising:
   a housing defining a transmission chamber as a separate space enclosing lubricating oil inside a crank chamber of an engine;
   a rotating input shaft, part of said rotating input shaft projecting outwardly from said transmission chamber;
   a drive force transmitting member for transmitting drive force of the engine to the continuously variable transmission, said drive force transmitting member being non-rotatably mounted on said part of said rotating input shaft projecting outwardly from said transmission chamber;
   a rotary drive member spline-coupled to said rotating input shaft;
   a rotary driven member supported for relative rotation on said rotating input shaft;
   at least one carrier half rotatably and slidably mounted on said rotating input shaft;
   a rotary member rotatably supported by said at least one carrier half;
   an output gear supported freely for relative rotation at an axial end of said rotating input shaft.

2. The continuously variable transmission drive input structure according to claim 1, wherein a centrifugal governor for controlling a transmission ratio of said continuously variable transmission is housed in said transmission chamber.

3. The continuously variable transmission drive input structure according to claim 1, wherein said drive force transmitting member is a gear.

4. The continuously variable transmission according to claim 1, wherein an opening in said transmission chamber wherein said portion of said rotating input shaft projects outwardly from said transmission chamber is sealed using a sealing member.

5. A power transmission apparatus comprising:
   a housing;
   a transmission shaft operatively connected to a continuously variable transmission located in a transmission chamber within said housing, a portion of said transmission shaft projecting outwardly from said transmission chamber;
   a drive force transmitting member transmitting drive force of an engine to said continuously variable transmission, said drive force transmitting member being non-rotatably mounted on said portion of said transmission shaft projecting outwardly from said transmission chamber;
   a drive force input member supported for relative rotation on an end of a crank shaft of said engine;
   a clutch supported between said drive force input member and said crank shaft;
   a sub-transmission in operable engagement with said continuously variable transmission, said sub-transmission including a reduction shaft; and
   a centrifugal governor operatively connected to said transmission shaft, said centrifugal governor including a rotary drive member secured to said transmission shaft and a first carrier half and a second carrier half operatively mounted relative to said transmission shaft, said first and said second carrier halves being movable relative to said rotary drive member for selectively changing the transmission ratio of said continuously variable transmission.

6. The power transmission apparatus according to claim 5, and further including a biasing member for normally biasing said first and second carrier halves to set said continuously variable transmission at a low ratio.

7. The power transmission apparatus according to claim 6, wherein an increase in rotational speed of said transmission shaft displaces said first and second carrier halves relative to said rotary drive member for varying the ratio setting of said continuously variable transmission.

8. The power transmission apparatus according to claim 6, and wherein said centrifugal governor includes a centrifugal weight operatively positioned between said first and second carrier halves for selectively changing the ratio of said continuously variable transmission proportional to an increase in rotational speed of said transmission shaft.

9. A continuously variable transmission and drive input structure therefor comprising:
   a housing defining a transmission chamber in which said continuously variable transmission is located;
   a transmission shaft providing a rotary input to said continuously variable transmission, a portion of said transmission shaft projecting outwardly from said transmission chamber;
   a drive force transmitting member transmitting drive force of an engine to the continuously variable transmission, said drive force transmitting member being non-rotatably mounted on said portion of said transmission shaft projecting outwardly from said transmission chamber;
   a drive force input member supported for relative rotation on an end of a crank shaft of said engine; and
   a clutch supported between said drive force input member and said crank shaft; and
   a centrifugal governor operatively connected to said transmission shaft, said centrifugal governor including a rotary drive member secured to said transmission shaft and a first carrier half and a second carrier half operatively mounted relative to said transmission shaft, said first and second carrier halves being movable relative to said drive member for selectively changing the transmission ratio of said continuously variable transmission.

10. The continuously variable transmission and drive input structure therefor according to claim 9, and further including a biasing member for normally biasing said first and second carrier halves to set said continuously variable transmission at a low ratio.

11. The continuously variable transmission and drive input structure therefor according to claim 9, wherein an increase in rotational speed of said transmission shaft displaces said first and second carrier halves relative to said rotary drive member for varying the ratio setting of said continuously variable transmission.

12. The continuously variable transmission and drive input structure therefor according to claim 9, and wherein said centrifugal governor includes a centrifugal weight operatively positioned between said first and second carrier halves for selectively changing the ratio of said continuously variable transmission proportional to an increase in rotational speed of said transmission shaft.

13. The power transmission apparatus according to claim 5, wherein said drive force input member is a gear.

14. The continuously variable transmission and drive input structure therefor according to claim 9, wherein said drive force input member is a gear.

* * * * *